3,000,808
PETROLEUM-BASED AMORPHOUS COMPOSITIONS
Harry Roden, Port Neches, Tex., assignor to Texaco Inc., a corporation of Delaware
No Drawing. Filed May 20, 1957, Ser. No. 660,427
13 Claims. (Cl. 208—23)

This invention relates to amorphous compositions based on materials of petroleum origin and more particularly to such compositions manufactured under conditions herein disclosed from asphaltic residua and paraffin wax oxidation products. This patent application is a continuation-in-part of my copending patent application of the same title, now abandoned, filed on May 19, 1955, and having Serial No. 509,699.

Broadly, the composition of my invention comprises highly oxidized macrocrystalline paraffin wax and at least one heavy asphaltic petroleum residuum selected from the group consisting of solid asphalt and viscous liquid residuum reducible to asphalt mixed under stripping conditions at temperature from about 450° to about 530° F. The composition has a variety of uses and is especially useful as a protective coating, a paving material, and a specialty fuel.

The high temperature stripping operation appears to effect complex polymerization and condensation reactions and physical changes in the charge mixture, thereby producing a tough amorphous solid having pronounced resistance to deterioration from heat or hydrocarbon solvents and good temperature susceptibility, i.e., having a small change in consistency with change in ordinary service temperature.

Use of temperature not substantially below about 450° F. or substantially above about 530° F. is necessary to effect the desired chemical and physical changes without substantial thermal cracking or carbonization. Advantageously, the reaction temperature is maintained between 460° and 510° F. and preferably between about 480° and 500° F.

Stripping conditions suitable for forming the novel composition can be established by blowing the reaction mixture with air, steam or inert gases such as nitrogen or flue gases, by reducing pressure on the mixture (as for example with steam jet exhausters), or by a combination of these procedures. Distillate will, of course, be formed in the manufacturing operation. It can be collected for use as a solvent, a metal cleaner or plasticizer or treated, for example, by fractionation to yield various organic materials. A general precept to be followed in the manufacture of my composition is that the stripping should be carried on until the resulting composition (exclusive of filler content) is not substantially more than about 95% and preferably from about 60 to 90% by weight of the original charge mixture (exclusive of filler material charged). Time of stripping should be at least about 5 hours and ordinarily will be from about 7 to about 14 hours.

Gas blowing of the charge provides suitable agitation, but supplementary mechanical agitation is advantageous in the reaction. Stripping by air blowing is preferred because products of practically any desired hardness can be obtained most efficiently and economically thereby. Air rate used can be from about 2–200 standard cubic feet per minute per ton of charge, and is preferably about 5 cubic feet per minute per ton in large batches. Elimination of low boiling acidic materials in the operation is believed to assist in creating homogeneity of the resulting product. A steel reactor is satisfactory for the operation.

By a highly oxidized paraffin wax I mean specifically a wax oxidate or mixture of wax oxidates having naphtha solubility not substantially above about 40% as determined by the following procedure: 100 grams of oxidate and 300–350 grams of Stoddard solvent having no appreciable distillation residue are mixed at the initial boiling point of the solvent; the mixture is cooled to 77° F. and allowed to settle into a lower insoluble portion and a supernatant solvent layer; the weight of the remaining solvent (S) is determined; an aliquot of 100 grams of the supernatent solvent layer is withdrawn; the Stoddard solvent is evaporated from the aliquot and the oxidate solute residue (R) is weighed; percent naphtha solubility of the oxidate is solved by the equation $$\frac{RS}{100-R}$$

Specifications for Stoddard solvent are found on page 241 of the 1953 edition of ASTM Standards on Petroleum Products and Lubricants, published by the American Society for Testing Materials, Philadelphia 3, Pennsylvania.

The highly oxidized macrocrystalline paraffin waxes useful in the practice of my invention are acidically-reacting, almost completely saturated materials (as measured by their iodine absorption). They can be made by catalytic air oxidation of slack waxes, semi-refined or refined waxes. For efficiency and economy in compounding the composition of my invention I prefer to use a wax oxidate obtained by oxidizing with air in the presence of a metalliferous wax oxidation catalyst (e.g., potassium permanganate, alkali metal chromates, manganese naphthenate, manganese dioxide, and the like) a relatively inexpensive slack wax using a pressure of at least 30 p.s.i.g. and temperature between 300° and 380° F., and carrying on the oxidation until the product has specific gravity between about 1.02 and about 1.08. One such slack wax which I have used with excellent results has an oil content between about 7 and about 25%. Alternatively, I have used, also with excellent results, the highly oxidized products of even more oily slack waxes and mixtures of slack waxes which have oil contents approaching as much as 50% and have somewhat higher molecular weights and viscosities. The slack wax raw materials for converting into oxidized waxes useful in my invention are obtainable from the solvent dewaxing of petroleum distillates in the manufacture of motor lubricating oils having S.A.E. number range from about 5 to about 50.

The heavy asphaltic petroleum residuum used in formulating a charge mixture for manufacture of my composition can be a normally solid asphalt obtained in refining petroleum operations, or a heavy viscous liquid residuum reducible to asphalt by conventional methods such as steam reduction, or a mixture of such residua.

The normally solid asphalt, i.e., having penetration below 300 at 77° F., can be obtained from the distillation of certain types of crude oil and refinery residua, and from the deasphalting of lubricating oil stocks. Such asphalt can have been reduced in consistency by steam, vacuum, air blowing, or a combination of these techniques prior to use in formulating the charge mixture.

The most important heavy viscous liquid residuum useful in the practice of my invention is a reduced cycle fuel oil, e.g., one obtained by distilling the more volatile constituents from the tarry aromatic residuum of a thermal cracking operation until Saybolt Furol viscosity of the remaining tar is below about 80 and preferably between about 25 and 50 at 210° F.; A.P.I. gravity of such material is from about 0° to about 12°; the viscosity property above is used ordinarily to characterize the material in petroleum refining operations. Upon further reduction thereof by steam distillation or air blowing such reduced cycle fuel oil can be converted to a normally solid asphalt exhibiting considerable change in fluidity with temperature (high susceptibility). Other liquid residua exhibiting similar properties, e.g., heavy residua from naphthenic base crude and reduced aromatic extracts of catalytically cracked gas oils, also can be used.

The end use to which the composition is to be put has an important bearing both on the selection of the particular asphaltic residuum to be used and also upon the ratio of wax oxidate: asphaltic residuum to be used in formulating charge mixture. The formulations are made correlative to special properties desired: e.g., in a pipe enamel, excellent resistance to hydrocarbon oils and hardness at ordinary temperature coupled with fluidity at about 400° F. for application to a pipe; in a paving ingredient, the ability to be applied by conventional paving machinery and resistance to disintegration from oil and heat; and in a gelled fuel composition containing high percentage of hydrocarbon oil, the ability to burn evenly by remaining gelatinous during the burning process.

In pipe enamel charge formulations, the weight ratio of wax oxidate: asphaltic residuum should be between about 0.1:1 and about 1:1, preferably about 0.5:1. Advantageously, the asphaltic residuum used in such formulations is entirely a reduced cycle fuel oil, or the solid asphalt obtained by steam reducing such cycle fuel oil to penetration at 77° F. of 30 to 100, or mixtures of such residua.

A pulverulent solid filler substance, preferably fine talc, but also suitably other inert solids such as mica, silica, glass flake or powder, slate flour or graphite can be mixed with the resulting enamel. Preferably, however, the filler is added to the charge before stripping because there then results in the product improved particle distribution, lower viscosity, and the virtual elimination of entrained air bubbles. The filler can be pretreated with a hydrophobic agent such as silicone polymer or a trialkyl phosphite if desired. Typical amounts of pulverulent solid filler in pipe enamel charge formulations are from 10 to 40 wt. percent.

Suitable charge mixtures for the pipe enamel of my invention will comprise by weight 40 to 60% and preferably 45 to 55% asphaltic residuum, 15 to 40% and preferably 20 to 30% wax oxidate and 10 to 30% fine talc. Minor amounts, i.e., up to about 15% by weight, of other materials compatible with asphalt such as antioxidants, fungicides, hydrophobic agents, bactericides, rubber, coal tar and/or coal tar pitch, can be added to the charge mixture if desired. Example 5, below, describes manufacture of the preferred pipe enamel of my invention.

In an oil-resistant paving composition the weight ratio of wax oxidate: asphaltic residuum should be between about 0.3:1 and 4:1 and preferably between about 0.5:1 and 3:1. Advantageously, the asphaltic residuum used in such formulation is entirely a reduced cycle fuel oil to render the resulting composition most readily adaptable for use in conventional paving machinery. A suitable charge mixture for making the paving binder of my invention comprises by weight 20 to 60% reduced cycle fuel oil and 40 to 80% of wax oxide. Asphalt antistripping agents and refractory solid filler material, e.g., asbestos, mica, or glass fiber, can be mixed with the charge or the resulting product if desired. An excellent asphaltic concrete for use in places of hard service can be made by hot mixing 85–97% by weight and preferably 90–95% by weight mineral aggregate and from about 3 to about 15%, preferably 5–10%, of the paving binder of my invention; alternatively the binder, filled or unfilled, can be used in surfacing or patching.

In the gelled fuels of my invention the weight ratio of wax oxidate: asphaltic residuum should be between about 2:1 and about 1:1, preferably about 1.5:1. The asphaltic residuum used is a solid asphalt less susceptible to temperature than the cracked asphalts heretofore described for the other special uses. Advantageously, the asphalt is an air-blown asphalt from naphthenic base crude and has softening point between about 100 and 160° F., preferably 120–140° F., and penetration at 77° F. of 30–70, preferably 40–60. Suitable charge mixtures for formulating the gelled fuel of my invention comprises by weight 15–25% asphalt, 25–35% wax oxidate and 40–60% of a light paraffin base mineral oil, e.g., a lubricating stock having S.U.S. viscosity at 210° F. from about 30 to about 55. When mixed with solid chemical oxidants, the gelled fuel burns vigorously and evenly.

The unusual refractory qualities of my composition render it useful also in a variety of other specific applications, e.g., for compounding: wire rope lubricant; hot roll neck grease; fiber and paper plying, impregnating and coating materials; pipeline wrapping; tile floor covering; automobile undercoating; sealing compounds, gasketing; and electric conduit coating.

The following examples show various ways in which my invention has been practiced but are not to be construed as limiting the invention. In this application all temperatures cited are in degrees Fahrenheit, all pressures are in pounds per square inch gauge, and all percentages are weight percentages. Gas volumes are referred to standard conditions of 32° F. temperature and one atmosphere pressure, and all parts are parts by weight. Ring-and-ball softening points, ductilities, and penetration measurements defined herein follow the test procedures described in the April 1953 handbook entitled ASTM Standards on Bituminous Constructional Materials, published by the American Society for Testing Materials.

*Example 1.*—A mixture of 25% heavy liquid asphaltic residuum from a naphthenic base crude and 75% highly oxidized semi-refined wax was mixed and airblown at temperature of 480–500° F. for 11 hours using an air rate of 1/10 cubic foot per minute per pound of initial mixture. The heavy residuum used had A.P.I. gravity of 10.8, viscosity of 75 Saybolt Furol seconds at 210° F. and flash point of 495. The highly oxidized wax, having naphtha solubility less than 30%, had been blown with steam to remove the volatile portion prior to use. Properties of wax oxidate used were as follows:

| | |
|---|---|
| Specific gravity, 77° F. | 1.091 |
| Flash point, C.O.C., ° F. | 460 |
| Viscosity, S.U.S. at 210° F. | 989 |
| Neut. No. | 190 |
| Sap. No. | 323 |

The resulting composition was homogeneous, elastic and practically insoluble in 86° A.P.I. gravity naphtha. Other properties of the product were as follows:

| | |
|---|---|
| Softening point ° F. | 327 |
| Ductility, 77° F. | 15 |
| Penetration at 77° F. | 39 |

*Example 2.*—A mixture of 75% asphalt prepared from the heavy liquid residuum used in Example 1, said asphalt having softening point of 250° F. and penetration at 77° F. of 5, and 25% of steam-reduced highly oxidized semi-refined wax like that used in Example 1, was mixed and airblown at 480–500° F. for 8½ hours using the same air rate as was used in Example 1.

The resulting composition was homogeneous, elastic and practically insoluble in 86° A.P.I. gravity naphtha. Other properties of the product were as follows:

| | |
|---|---|
| Softening point, ° F. | 161 |
| Ductility, 77° F. | 17 |
| Penetration at 77° F. | 45 |

*Example 3.*—A mixture of 33.1% highly oxidized semi-refined wax, 41.3% reduced cycle fuel oil, 8.3% steam-reduced asphalt, and 17.3% fine talc was mechanically blended at 450° F., then blown with air in a stainless steel vessel at 480° to 500° F. for 12½ hours. Air rate used was about 0.008 cubic feet per minute per pound of charge. Properties of charge ingredients were as follows:

Oxidized wax:
- Gravity, ° A.P.I. _____ 2.6
- Viscosity, S.U.S. at 210° F. _____ 87.4
- Neut. No. _____ 310
- Sap. No. _____ 486
- Unsaponifiable _____ percent__ 5.7
- Naphtha solubility _____ do____ 24.2

Reduced cycle fuel oil:
- Viscosity, S.F.S. at 210° F. _____ 34

Steam-reduced asphalt:
- Softening point, ° F. _____ 126
- Ductility, 77° F. _____ 200+
- Penetration, 77° F. _____ 57

Talc—Sieve grading (wet):
- Passed No. 100 _____ percent__ 99.55
- Passed No. 200 _____ do____ 95.46
- Passed No. 325 _____ do____ 82.81
- Packed weight, pounds per cubic foot_____ 65
- Moisture _____ percent__ 0.25
- Loss of ignition _____ do____ 4.9

The resulting composition was about 73.1% of the original charge mixture. The composition was applied in a molten state as a protective coating to metal strips. The coated strips were immersed in crude oil for about six months. At the end of this period the coatings were found to be hard and intact on all specimens. Properties of the coating composition so made were as follows:

- Specific gravity, 77° F. _____ 1.285
- Flash point, C.O.C. ° F. _____ 410
- Softening point, ° F. _____ 192
- Ductility, 77° F. _____ 0
- Penetration, 7° F. _____ 6
- Ash _____ percent__ 22.2

*Example 4.*—A batch of slack wax was oxidized by air blowing for 5 hours at 330° F. and 65 p.s.i.g. pressure in the presence of 0.4 weight percent potassium permanganate catalyst (added to the wax as a water solution) based on the initial weight of slack wax. Air rate used was 20 standard cubic feet per hour per pound of slack wax charged. Properties of the slack wax were as follows:

- Flash point C.O.C. ° F. _____ 410
- Viscosity, S.U.S. at 210° F. _____ 38.5
- Oil content _____ percent__ 13.1

The resultant slack wax oxidate was suitable for incorporation into charge mixtures for making the compositions of my invention. It had the following properties:

- Naphtha solubility _____ percent__ 5
- A.P.I., gravity _____ 0.9°
- Neut. No. _____ 203
- Sap. No. _____ 423
- Unsaponifiable _____ percent__ 7.0

*Example 5.*—A mixture of 28% oxidized slack wax made in the manner of Example 4 and having essentially the same properties, 43% steam-reduced cycle fuel asphalt, 10% soft coal tar pitch and 19% fine talc was blown with air in a mechanically agitated steel vessel at temperature of 460–500° F. for 11.2 hours. Air rate used was 5.5 cubic feet per minute per ton of charge. The talc used was essentialy the same as that shown in Example 3; the asphalt used had 77° F. penetration of 33 and softening point of about 120° F.; the coal tar pitch had penetration of 77° F. of 10 and softening point of 137° F.

Yield of the resulting composition was about 83% and approximate test properties were:
- Softening point, ° F. _____ 215
- Penetration, 150° F., 50 gram load, 5 seconds_____ 38
- Viscosity, centipoises at 375° F. _____ maximum__ 1850
- Ash _____ percent__ 20

A conventional double coat-double wrap shop application of the composition was made at temperature of about 400–425° F. to continuously advancing and revolving steel pipe, the reinforcing wrap in the application being glass fiber and the outer wrap being asphalt-saturated asbestos felt. Pipes so protected were used in an underground pipe line for oil transmission service in the vicinity of an oil refinery where rapid deterioration of conventional pipe enamels previously had been experienced.

*Example 6.*—Three batches of experimental paving binders were made by mechanically stirring and air blowing at 480–500° F. the following charge mixtures:

| Ingredients | Batch I | Batch II | Batch III |
|---|---|---|---|
| | Percent | Percent | Percent |
| Oxidized slack wax | 75 | 50 | 60 |
|   Naphtha solubility below 30%. | | | |
|   A.P.I. gravity 0.9°. | | | |
|   Neut. No. 203. | | | |
|   Sap. No. 423. | | | |
| Reduced cycle fuel oil | 25 | 50 | 30 |
|   Viscosity, Saybolt Furol seconds at 210° F. of 31. | | | |
| Steam-reduced asphalt | | | 10 |
|   57 penetration at 77° F. | | | |
| Yield after air blowing | 66.3 | 75.2 | 71.6 |

Properties of the binders so made were as follows:

| | Batch I | Batch II | Batch III |
|---|---|---|---|
| Specific gravity, 77° F. | 1.076 | 1.090 | 1.074 |
| Softening point, ° F. | 125 | 120 | 125 |
| Ductility, 77° F. | 62 | 64 | 112 |
| Penetration, 77° F. | 98 | 96 | 86 |
| Viscosity, centipoises at 300° F. | 390 | 160 | 275 |

*Example 7.*—Samples of each of the paving binders described in Example 6, above, were mixed at 300° F. with mineral aggregate for 2 minutes in a mechanical mixer and the hot mix compressed at 500 pounds per square inch into a number of 8″ diameter by 2″ high steel molds. The aggregate consisted of 40% ⅛″–¼″ grading crushed gravel, 40% river sand of about 10–200 mesh size, and 20% green slate flour, 53.54% of which passed a 325 mesh screen. Each paving specimen so prepared consisted of 6% of said binder and 94% aggregate.

Three specimens were made from each batch of binder. One set of said specimens from each batch of binder was exposed to atmosphere continuously for four weeks. A second set of said specimens from each batch of binder received the identical exposure, except that on four consecutive Fridays 200 ml. of liquid hydrocarbon fuel having A.P.I. gravity of 54.5° was poured onto each of this set of specimens within a period of 15–30 minutes; and on four consecutive Mondays, water was sprayed on each specimen of the second set for 2 hours. A third set of specimens from each batch of binder was subjected to the same conditions as the second set, and, in addition, on four consecutive Wednesdays a vertically downward blast of flame from a kerosine fuel burner was played on the surface of each of this set of specimens for 15 minutes from a height of about 6–8 inches above the specimen surfaces. Specimen surface temperatures reached 900–1500° F. as measured with a thermocouple.

After the four week test cycle all specimens were air-cured for 3 additional days, cleaned, photographed, examined, and tested for shear resistance. The surfaces of each specimen were hard, intact, and compacted at the end of the test period. Each appeared entirely satisfactory for a paving. Shear resistance values in pounds per square inch for each set of specimens are tabulated below:

*Shear resistance, p.s.i.*

| Binder | Set I | Set II | Set III |
|---|---|---|---|
| Batch I | 305 | 182 | 191 |
| Batch II | 368 | 142 | 253 |
| Batch III | 286 | 176 | 116 |

Control specimens of 6% vacuum-reduced 85–100 penetration paving asphalt and 94% of said aggregate exposed in similar fashion were seriously effected by the spilled fuel which leached the binder and loosened the aggregate surface; in addition, the mass of aggregate was softened and easily disintegrated. Furthermore, the flame blast carbonized the asphalt surface of the control specimens. Shear resistance of the specimens made with the paving binder of my invention was approximately 1.5 to 2.5 times that of the control specimens compounded with asphalt and aggregate.

*Example 8.*—Equal parts of reduced cycle fuel oil and highly oxidized paraffin wax were charged into a reactor, agitated and blended for 30 minutes at 125° F., then sufficient fine talc was added to produce an enamel product containing about 30% talc filler after air blowing. The reduced cycle fuel oil used had viscosity of 32 Saybolt Furol seconds at 210° F.; the wax oxidate had naphtha solubility less than 30%, A.P.I. gravity of 13.1°, S.U.S. viscosity at 210° F. of 115.3, Neut. No. of 262, Sap. No. 437, and unsaponifiable content of 4.96. The talc used was essentially the same as that described in Example 3.

The total charge was airblown at 480–500° F. for 12.8 hours with mechanical stirring. Yield of product was 69%. The product was useful as protective coating and had the following characteristics:

Specific gravity, 77° F _____ 1.371
Softening point, ° F _____ 238
Penetration, 77° F _____ 2
Viscosity, centipoises at 450° F _____ 3650

The composition was applied as a film to a metal strip. It went on as a smooth coat with no air bubbles. The coated strip was immersed in crude mineral oil for one month and then critically inspected. The coating was found to be undissolved, intact, uncracked, and there was no metal exposed.

*Example 9.*—A charge mixture was made up as follows: 30 parts of highly oxidized semi-refined paraffin wax, said wax oxidate having naphtha solubility less than 30%, A.P.I. gravity of 13.1 S.U.S., viscosity at 210° F. of 115.3, Neut. No. of 262, Sap. No. of 437, and an unsaponifiable content of 4.96%; 20 parts of an airblown vacuum reduced asphalt from a naphthenic base crude, said asphalt having softening point of 131° F. and penetration at 77° F. of 52; and 50 parts of paraffin base lubricating oil having A.P.I. gravity of 31.4 flash point (C.O.C.) of 420; S.U.S. viscosity at 210° F. of 44.2, viscosity index of 99, and pour point of −15° F. This charge mixture was mechanically agitated and air blown in a steel converter for 7½ hours at 480–500° F. using 0.03 cubic feet per minute of air per pound of charge.

The product, 67.4 parts of a gelled, black, grease-like solid, had the following properties which made it a useful fuel gel for blending with chemical oxidants:

Specific gravity, 77° F _____ 0.952
Flash point, C.O.C. ° F _____ 415
Softening point, ° F _____ 217
Ductility, 77° F _____ 1
Viscosity:
   Megapoises at 60° F _____ 5.50
   Megapoises at 140° F _____ 0.122

*Example 10.*—A mixture of 36% slack wax having A.P.I. gravity of 36.3° and viscosity at 210° F. of 54.9 S.U.S., and 64% slack wax having A.P.I. gravity of 40.7° and viscosity at 210° F. of 62.3 S.U.S., said slack waxes having a high oil content and having been obtained from the solvent dewaxing of petroleum distillate in the manufacture of motor lubricating oil, was oxidized in an aluminum reactor for five hours at temperature of 330° and pressure of 65, using 3000 standard cubic feet of air per pound of the slack wax charge and 0.6% potassium permangate catalyst based on the weight of the slack wax charge. The resulting wax oxidate had Neut. No. of 129, Sap. No. of 295, specific gravity of 1.050, S.U.S. viscosity at 210° F. of 1773, 10% non-saponifiable material, and naphtha solubility of 35.3%.

A mixture of 65% of this wax oxidate and 35% of cycle fuel oil was blown with air at temperature of 480–500° F. without mechanical agitation to yield a paving binder amounting to 82.9% of the combined weights of the wax oxidate and the cycle fuel oil initially charged to the converter. Properties of the binder so made were as follows:

Specific gravity, 77° F _____ 1.054
Soft point, ° F _____ 120
Flash point C.O.C., ° F _____ 465
Penetration, 77° F _____ 95
Ductility, 77° F _____ 69
Viscosity at 300° F., centipoises _____ 232

*Example 11.*—Five hot-mix asphaltic concrete test specimens herein referred to as samples numbered 1, 2, 3, 4, and 5, were prepared from mineral aggregate and the binder described in Example 10 using 94% mineral aggregate and 6% binder. The hot mix was compressed at 500 pounds per square inch for two minutes in 8″ I.D. by 2″ high circular steel molds to give specimens 8″ in diameter, approximately 1.29″ thick, weighing 4.94 pounds (plus or minus 0.03 pound) and having average bulk density of 128.5 pounds per cubic foot. The steel mold was not removed during the tests hereinafter described.

The aggregate consisted of 52% crushed New Jersey trap rock, having size grading (U.S. Standard) of 77.7% from 4–10 mesh, 21.6% from 10–20 mesh, and 0.7% from 20–30 mesh; river sand having size grading of 22.3% from 10–20 mesh, 27.7% from 30–40 mesh, 32.6% from 40–50 mesh, 9.5% from 50–60 mesh, 6.8% from 60–80 mesh, and the balance finer than 80 mesh; and 15% New Jersey trap rock fines having size grading all finer than 60 mesh. In preparing of the hot mix the binder was heated rapidly to 290–310° F. and combined with the mineral aggregate which had been preheated to 325° F. The aggregate and binder were mechanically mixed for one minute, dumped into a pan and hand-mixed to redistribute uncoated fines, then returned to the mechanical mixer and again mixed for one minute for obtaining complete coverage of the aggregate.

Sample No. 1 of such experimental concrete was submitted to a severe fuel spillage test. The liquid hydrocarbon fuel used in said test tested typically to have A.P.I. gravity of 52.9°, A.S.T.M. distillation range from 138° to 443° F., Reid vapor pressure at 100° F. at 2.4 p.s.i.g., and 12% aromatics. One quart of this hydrocarbon fuel was poured through a 5/32″ orifice situated 30″ above the specimen. Each such spill lasted about two minutes. Temperature during the test was about 70–95° F. This spillage was repeated at two-hour intervals four times a day, five days a week for 16½ days. Accordingly, the specimen was soaked with the spilled fuel for the period of 16½ days of testing. At the end of 10, 30, and 50 such spills of the fuel the sample was examined for depth and area of central erosion. Loosening and disintegration of the compressed aggregate was observed by rolling a sharp-edged steel wheel over the specimen, using the same path each time, measuring the width and depth of the track, and noting if aggregate was bulged or displaced. The steel wheel was 8″ in diameter, weighed 21 pounds, was ½″ wide at the base of the rim, and presented a V-shaped apex of the rim to contact with the sample, the bottom of the V being a right angle bisected by a line normal to the sample. Summary of results from said severe fuel spillage test is given below. Shear resistance of sample No. 2, which was left alone, was 108.1 p.s.i.

| No. of Fuel Spills | Center Erosion | | Wheel Cut Width, Inches |
|---|---|---|---|
| | Diam., Inches | Depth, Inches | |
| 10 | 0.0 | 0.0 | 0.16 |
| 30 | 0.0 | 0.0 | 0.16 |
| 50 | 0.0 | 0.0 | 0.16 |

After 50 spills shear resistance of sample No. 1 was 48.7 p.s.i. A control specimen of 6% conventional paving asphalt and 94% of the same kind of aggregate, said specimen being compounded as described above, was completely disintegrated after two spills of the same kind of fuel.

Sample numbers 3, 4, and 5 were then subjected to general tests for four weekly cycles. Sample No. 3 was subjected to atmospheric exposure, water spray, and freeze-and-thaw conditions for four weekly cycles. Sample No. 4 was made to undergo the same series of exposures plus a spill of hydrocarbon fuel of the same kind as that used in the severe fuel spillage test, hereinbefore described. Sample No. 5 was made to undergo all the exposures that sample No. 4 had undergone plus a heat blast. More specifically, the specimens were exposed continuously, except as otherwise noted below, to sunlight, rain, wind and natural temperature changes (60°–95°) for a four-week test period with the following additional treatment: water spray—starting at 8 a.m. each Wednesday all specimens were sprayed with river water for twenty-five hours; freeze—at 8 a.m. each Tursday all specimens were drained of superficial water and then maintained at 0–10° F. for 24 hours; thaw—at 8 a.m. each Friday all specimens were returned to the outdoor test area to thaw and remain under atmospheric conditions until Monday at 8 a.m.; heat blast—each Monday at 8 a.m. the sample No. 5 was subjected to 15 minutes from a vertically downward blast of heat from a flame sprayer, the tip of the flame being approximately 10–14″ above the central area of the specimen surface to register a temperature of 700–1000° F. by thermocouple on the surface of the specimen; spilled hydrocarbon fuel—each Tuesday at 8 a.m. sample Numbers 4 and 5 were subjected to the dropwise application of 200 ml. of liquid hydrocarbon fuel over a period of four hours, the fuel falling from a height of 2–4″ and directed to the center of the horizontal specimen surface.

At the conclusion of the fourth week of testing sample numbers 3, 4, and 5 were examined for surface erosion and shear resistance and sample Nos. 3 and 4 also for abrasion loss.

The abrasion loss test was made to determine the amount of loosened aggregate on the exposed surface of the 8″ diameter test specimen. Said test procedure was as follows: A 2.75 wide by 8″ long wood-backed stiff tampico fiber scrub brush having 70 knots of 1.25″ fibers was manually brushed in the same path across a specimen for twenty-five complete strokes. The amount of loosened fine aggregate was gleaned and weighed to the nearest 0.1 gram. The table below summarizes the results of the general tests.

| Sample No. | Surface Erosion | Abrasion Loss, gms. | Shear Resistance, p.s.i. |
|---|---|---|---|
| 3 | negligible | 0.7 | 198.1 |
| 4 | do | 0.9 | 84.7 |
| 5 | do | | 95.8 |

Three control specimens compounded in the same way but of 6% conventional paving asphalt and 94% of the same kind aggregate were exposed as counterparts of sample Numbers 3, 4, and 5, respectively. The conventional sample submitted to the same tests as sample No. 3 had negligible surface erosion, 0.2 gram abrasion loss and shear resistance of 84.8 p.s.i. The two other conventional samples submitted to the same tests as samples 4 and 5, above, were almost completely disintegrated after the second week, and no tests were made because of this condition. The surfaces of each sample of the experimental asphaltic concrete were hard, intact, and compact at the end of the test period, and each appeared to be satisfactory as a paving.

I claim:

1. An amorphous composition comprising oxidized macrocrystalline paraffin wax having naphtha solubility not substantially above 40% and heavy asphaltic petroleum residuum selected from the group consisting of solid asphalt and viscous liquid residuum reducible to asphalt in a weight ratio of said oxidized wax: said heavy petroleum residuum from about 0.1:1 to about 4:1, said oxidized wax and said petroleum residuum mixed under stripping conditions at a temperature from about 450° F. to about 530° F.

2. A composition comprising oxidized macrocrystalline paraffin wax having naphtha solubility not substantially above 40% and heavy asphaltic petroleum residuum selected from the group consisting of solid asphalt and viscous liquid residuum reducible to asphalt in a weight ratio of said oxidized wax: said heavy asphaltic petroleum residuum between about 0.1:1 and about 4:1 and mixed under stripping conditions at a temperature from about 450 to about 530° F.

3. A composition comprising oxidized macrocrystalline paraffin wax having naphtha solubility not substantially above 40% and heavy asphaltic petroleum residuum selected from the group consisting of solid asphalt and viscous liquid residuum reducible to asphalt in a weight ratio of said oxidized wax: said heavy residuum between about 0.3:1 and 4:1 and mixed under stripping conditions at a temperature from about 450° F. to 530° F.

4. The composition of claim 1 wherein said oxidized wax is a slack wax oxidate and the stripping is performed with air.

5. The composition of claim 2 wherein the stripping is performed with air.

6. A composition, the product of fluxing and air blowing at temperature of 460–510° F. a charge mixture comprising 40–60 weight percent of heavy asphaltic petroleum residuum selected from the group consisting of solid asphalt and viscous liquid residuum reducible to asphalt, 15 to 40 weight percent of a paraffin wax oxidate having naphtha solubility not substantially above 40%, and 10 to 40 weight percent of pulverulent solid filler until the weight of the resulting composition exclusive of said filler is not substantially more than 95% of the weight of said charge mixture exclusive of said filler.

7. The composition of claim 6 wherein the temperature used is between about 480° and 500° F. and said charge mixture comprises: 45 to 55 weight percent cracked residuum reducible to asphalt, said residuum having Saybolt Furol viscosity at 210° F. from 25 to 50, 20 to 30 weight percent of slack wax oxidate; and 10 to 30 weight percent fine talc.

8. A composition of claim 6 wherein the temperature used is between about 480° and 500° F. and said charge mixture comprises: 45 to 55 weight percent normally solid asphalt steam reduced from cracked residuum, said asphalt having softening point between about 100° and 200° F. and penetration at 77° F. of 30 to 100; 20 to 30 weight percent of slack wax oxidate; and 10 to 30 weight percent fine talc.

9. The composition of claim 3 wherein the petroleum residuum is a cracked residuum reducible to solid asphalt and the stripping is performed at 460–510° F. by air.

10. A composition, the product of mixing and air blowing at temperature of 480–500° F. to a weight not substantially more than 95% of its original value the charge mixture consisting essentially of: 20 to 60 weight percent of a cracked petroleum residuum reducible to asphalt, said residuum having Saybolt Furol viscosity at 210° F. from 25 to 50, and 40 to 80 weight percent of a slack wax oxidate having naphtha solubility not substantially above 40%.

11. A composition comprising 85–97 weight percent mineral aggregate and 3 to 15 weight percent binder, said binder being the product of mixing and air blowing at temperature of about 480°–500° F. to a weight not substantially more than 95% of its original value the charge mixture consisting essentially of: 20 to 60 weight percent of a cracked petroleum residuum reducible to solid asphalt, said residuum having Saybolt Furol viscosity at 210° F. from 25 to 50, and 40 to 80 weight percent of a slack wax oxidate having naphtha solubility not substantially above 40%.

12. A composition, the product of mixing and air blowing at temperature of about 460° to about 510° F. the mixture comprising 15 to 25 weight percent normally solid asphalt, 25 to 35 weight percent highly oxidized paraffin wax, and 40 to 60 weight percent of a paraffin base lubricating oil having S.U.S. viscosity at 210° F. between about 30 and about 55.

13. The composition of claim 12 wherein the asphalt used has softening point between 120 and 140 and penetration at 77° F. of 40 to 60.

References Cited in the file of this patent

UNITED STATES PATENTS

| | | |
|---|---|---|
| 1,779,067 | Hepburn | Oct. 24, 1930 |
| 2,102,005 | Jones et al. | Dec. 14, 1937 |
| 2,570,990 | Southern et al. | Oct. 9, 1951 |
| 2,716,085 | Ayers et al. | Aug. 23, 1955 |
| 2,720,466 | Kalinowski et al. | Oct. 11, 1955 |
| 2,721,146 | Hardman | Oct. 18, 1955 |
| 2,759,843 | Hardman et al. | Aug. 21, 1956 |
| 2,785,078 | Keating et al. | Mar. 12, 1957 |
| 2,785,111 | Vierk | Mar. 12, 1957 |
| 2,802,751 | Hetzel | Aug. 13, 1957 |
| 2,807,554 | Serey et al. | Sept. 24, 1957 |

OTHER REFERENCES

H. Abraham: Asphalt and Allied Substances, fifth ed., vol. 1, Van Nostrand, New York, 1945, pages 468, 470 and 479–481.